United States Patent Office 2,765,344
Patented Oct. 2, 1956

2,765,344
CRYSTALLIZABLE PENTAENE ALDEHYDE COMPLEXES

Charles H. Benton and Charles D. Robeson, Rochester, N. Y., assignors to Eastman Kodak Company, Rochester, N. Y., a corporation of New Jersey No Drawing. Application March 1, 1954,
Serial No. 413,417

20 Claims. (Cl. 260—598)

This invention relates to crystallizable complexes of trans,trans pentaene aldehydes having the carbon skeleton and chemical composition of vitamin A aldehyde and is particularly concerned with crystallizable complexes of 2,6-trans,trans vitamin A aldehyde.

Vitamin A aldehyde is itself an active form of vitamin A material and also is useful as an intermediate for conversion to vitamin A alcohol and vitamin A esters such as the acetate and the palmitate which are in common commercial use. Vitamin A aldehyde exists in several isomeric forms. Thus, vitamin A aldehyde exists in the form of geometrical isomers based on the cis or trans configuration around the olefinic double bonds in the 2 and 6 positions as starred in the following formula:

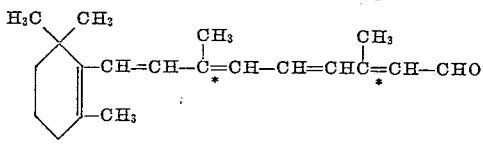

The geometrical isomers include 2,6-trans,trans vitamin A aldehyde; 2,6-cis,cis vitamin A aldehyde; 2-trans-6-cis vitamin A aldehyde; and 2-cis-6-trans vitamin A aldehyde. Of the geometrical isomers, however, the 2,6-trans,trans form exhibits the highest biological activity and it is therefore desirable to separate the 2,6-trans,trans aldehyde from the cis forms when, as is often the case, they occur in admixture. Because of the closely related properties of the cis and trans forms, however, it is difficult to effect such separations.

It is accordingly an object of this invention to selectively convert the trans,trans pentaenals having the carbon skeleton and chemical composition of vitamin A aldehyde to derivatives which can be readily separated from the cis forms.

It is another object of this invention to provide new crystallizable derivatives of trans,trans pentaenals corresponding to vitamin A aldehyde from which the trans,-trans pentaenal can readily be regenerated.

It is a further object of this invention to facilitate the separation of highly active forms of vitamin A aldehyde from closely related isomers having lower biological activity.

Another object of the invention is to provide crystallizable complexes of trans,trans vitamin A aldehyde unmixed with any substantial amount of cis forms of vitamin A aldehyde.

Another object of the invention is to provide selective trans,trans vitamin A aldehyde complexes.

Other objects will be apparent from the description and claims which follow.

These and other objects are attained by means of this invention as described more fully hereinafter with particular reference to preferred embodiments thereof. We have discovered that phenolic materials having the formulas

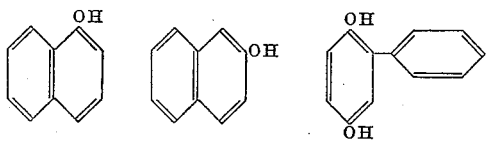

and

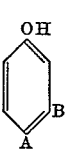

where A is a hydrogen atom, a halogen atom or an alkyl radical, B is a hydrogen atom, a hydroxyl radical, an alkyl radical or a halogen atom, D is an alkyl radical or a halogen atom, E is an alkyl radical, and at least one of the substituents A and B being a hydrogen atom, selectively form crystallizable complexes with 2,6-trans,-trans pentaenals having the vitamin A aldehyde carbon skeleton and chemical composition but do not form crystallizable complexes with the isomeric cis forms of such aldehydes as the cis,cis forms, the cis,trans forms, or the trans-cis forms.

Alkyl radicals in the above-disclosed complexing phenolic materials are preferably radicals of one to six carbon atoms, although alkyl radicals of greater than six carbon atoms can be suitably employed. Likewise, any of the halogens such as chlorine, bromine, iodine and fluorine can be suitably substituted in the generic formulas as disclosed above.

Among the suitable complexing materials are phenol; meta-alkyl, meta-halogen and meta-hydroxy substituted phenols, such as 3-methylphenol, 3-ethylphenol, 3-octylphenol, 3-chlorophenol, resorcinol and similar meta substituted phenols; para-halogen and para-alkyl substituted phenols, such as 4-methylphenol, 4-butylphenol, 4-bromophenol and similar para substituted phenols; alpha-naphthol and beta-naphthol; phenyl hydroquinone; 3,4-dialkylphenols such as 3,4-dimethylphenol, 3,4-dibutyl-phenol and similar 3,4-dialkylphenols; 3-alkyl-4-halogen substituted phenols as 3-methyl-4-bromophenol, 3-amyl-4-chlorophenol and similar 3-alkyl-4-halogen substituted phenols; and like compounds having the formulas as set out hereinabove.

The exact nature of the separable complex formed is not known, but the aldehyde is readily regenerated in unchanged form by washing with aqueous alkali or the like. The product thus appears to be a complex rather than a chemically substituted derivative. The complexes are composed of equimolar proportions of 2,6-trans,trans vitamin A aldehyde and any one of the hereinabove-mentioned complexing materials.

The complexes are readily formed by adding the complexing material to a solution of the trans,trans pentaenal in an inert organic solvent such as petroleum ether, hexane or a similar low boiling petroleum fraction, ethyl ether, methanol, ethanol, benzene or the like, or by adding the complexing material directly to a liquid mixture containing the trans,trans pentaenal if the complexing material is soluble in the mixture under the conditions of addition. The complex is formed upon standing at room temperature, but slightly elevated temperatures, such as 40–70° C., are desirably used to aid in dissolving the phenolic complexing material. The complexes formed in accordance with this invention are then separated from the mixture by such methods as crystallization, distillation, adsorption and other well-known separating methods. The separation is readily accomplished because the chemical and physical properties of the complex differ greatly from the uncomplexed cis isomers left in the reaction mixture. The complexes embodying the invention are readily crystallizable and have relatively low solubility in inert organic solvents. The separation is thus readily accomplished by cooling and concentrating the reaction mixture to cause fractional crystallization of the complex. With solvents such as petroleum ether, ethyl ether or the like, crystallization occurs readily at room temperature, although lower temperatures can be used if desired. Alternatively, the entire reaction mixture can be dried and the uncomplexed cis isomers leached out of the solid residue with an organic solvent, the cis forms of vitamin A aldehyde being readily soluble in most common organic solvents.

The invention is illustrated by the following example of certain preferred embodiments thereof, it being understood that the example is not intended to limit the scope of the invention unless otherwise specifically indicated.

*Example*

A 2.0 g. portion of distilled, mixed, trans and cis isomeric vitamin A aldehydes, and a .50 g. portion of phenol were dissolved in petroleum ether (boiling range, 40–60° C.). The volume of the resulting solution was reduced by evaporation on a steam bath under nitrogen until incipient precipitation of crystals. The mixture was thereafter chilled to −20° C. and the resulting gold colored crystals were removed by filtration, washed with petroleum ether and dried. The crystalline precipitate, the phenol complex of 2,6-trans,trans vitamin A aldehyde, had a melting range of 72–73.5° C. and $$E^{1\%}_{1cm.}(380) = 1228$$

As in the above example, other phenolic materials can be similarly employed to separate 2,6-trans,trans vitamin A aldehyde from the cis isomeric forms of vitamin A aldehyde. The following table discloses several phenolic materials that can be used to selectively crystallize and separate 2,6-trans,trans vitamin A aldehyde from an isomeric mixture of vitamin A aldehyde and some of the physical properties of the resulting complexes.

| Complexing Material | Color of Complex | M. P., °C. | Specific Absorbency at 380–1 mμ |
|---|---|---|---|
| α-naphthol | red | 60.7–62.0 | 1,060 |
| β-naphthol | orange | 50.1(d) | 845 |
| phenylhydroquinone | orange-brown | 67.0–68.4 | 893 |
| phenol | gold | 76.3–78.8 | 1,111 |
| 3-methylphenol | orange | 46.8–48.0 | 998 |
| 3-hydroxyphenol | red | 83.8–85.6 | 1,133 |
| 4-methylphenol | gold | 53.2–55.4 | 1,202 |
| 3,4-dimethylphenol | orange | 57.0–58.6 | 953 |
| 4-chloro-3-methylphenol | red-orange | 46.8–47.5 | 961 |
| 3-bromophenol | coral | 42.2–44.0 | 1,058 |
| 4-chlorophenol | yellow | 42.5–43.2 | 987 |

Similar results are obtained with other complexing materials as described hereinbefore when reacted with 2,6-trans,trans pentaenals having the vitamin A aldehyde carbon skeleton and chemical composition. Since the cis forms of vitamin A aldehyde do not form crystallizable complexes in accordance with this invention, the 2,6-trans,trans complexes are readily separated from impure mixtures of the trans,trans aldehydes with cis isomers thereof, and pure trans,trans vitamin A aldehyde is readily obtained by washing the complexing material out of the crystalline complex product with aqueous alkali.

Although the invention has been described in considerable detail with reference to certain preferred embodiments thereof, it will be understood that variations and modifications can be effected within the spirit and scope of the invention as described hereinabove and as defined in the appended claims.

We claim:

1. A crystallizable complex of a 2,6-trans,trans pentaene aldehyde having the carbon skeleton and chemical composition of vitamin A aldehyde with a member selected from the group consisting of compounds with the formulas

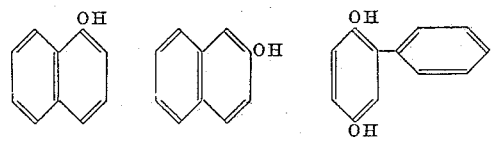

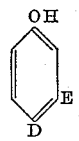

and

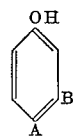

where A is selected from the group consisting of hydrogen atoms, halogen atoms and alkyl radicals, B is selected from the group consisting of hydrogen atoms, halogen atoms, alkyl radicals and hydroxyl radicals, D is selected from the group consisting of alkyl radicals and halogen atoms, E is an alkyl radical, at least one of the substituents A and B being a hydrogen atom, said complex being crystallizable in inert organic solvents.

2. A crystallizable complex of a 2,6-trans,trans pentaene aldehyde having the carbon skeleton and chemical composition of vitamin A aldehyde with a compound of the formula

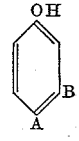

where A is selected from the group consisting of hydrogen atoms, halogen atoms and alkyl radicals, B is selected from the group consisting of hydrogen atoms, halogen atoms, alkyl radicals and hydroxyl radicals, at least one of the substituents A and B being a hydrogen atom, said complex being crystallizable in inert organic solvents.

3. A crystallizable complex of a 2,6-trans,trans pentaene aldehyde having the carbon skeleton and chemical composition of vitamin A aldehyde with a compound of the formula where A is selected from the group consisting of hydrogen atoms, halogen atoms and lower alkyl radicals, B is selected from the group consisting of hydrogen atoms, halogen atoms, lower alkyl radicals and hydroxyl radicals, at least one of the substituents A and B being a hydrogen atom, said complex being crystallizable in inert organic solvents.

4. A crystallizable complex of a 2,6-trans, trans pentaene aldehyde having the carbon skeleton and chemical composition of vitamin A aldehyde with a compound of the formula

where D is selected from the group consisting of alkyl radicals and halogen atoms, E is an alkyl radical, said complex being crystallizable in inert organic solvents.

5. A crystallizable complex of a 2,6-trans, trans pentaene aldehyde having the carbon skeleton and chemical composition of vitamin A aldehyde with a compound of the formula

where D is selected from the group consisting of lower alkyl radicals and halogen atoms, E is a lower alkyl radical, said complex being crystallizable in inert organic solvents.

6. A crystallizable complex of a 2,6-trans, trans pentaene aldehyde having the carbon skeleton and chemical composition of vitamin A aldehyde with alpha-naphthol, said complex being crystallizable in inert organic solvents.

7. A crystallizable complex of a 2,6-trans, trans pentaene aldehyde having the carbon skeleton and chemical composition of vitamin A aldehyde with beta-naphthol, said complex being crystallizable in inert organic solvents.

8. A crystallizable complex of a 2,6-trans, trans pentaene aldehyde having the carbon skeleton and chemical composition of vitamin A aldehyde with phenylhydroquinone, said complex being crystallizable in inert organic solvents.

9. A crystallizable complex of a 2,6-trans, trans pentaene aldehyde having the carbon skeleton and chemical composition of vitamin A aldehyde with phenol, said complex being crystallizable in inert organic solvents.

10. A crystallizable complex of a 2,6-trans, trans pentaene aldehyde having the carbon skeleton and chemical composition of vitamin A aldehyde with 3,4-dimethyl phenol, said complex being crystallizable in inert organic solvents.

11. The method which comprises admixing a mixture containing a 2,6-trans, trans pentaenal having the carbon skeleton and chemical composition of vitamin A aldehyde with a phenol selected from the group consisting of compounds with the formulas

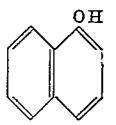 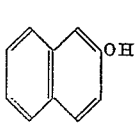 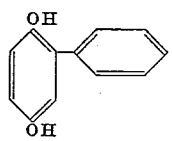

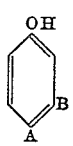

and

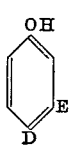

where A is selected from the group consisting of hydrogen atoms, halogen atoms and alkyl radicals, B is selected from the group consisting of hydrogen atoms, halogen atoms, alkyl radicals and hydroxyl radicals, D is selected from the group consisting of alkyl radicals and halogen atoms, E is an alkyl radical, at least one of the substituents A and B being a hydrogen atom, and thereby forming a crystallizable complex of said phenol and said pentaenal, and separating said complex from said mixture.

12. The method which comprises admixing a phenolic compound of the formula

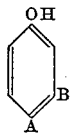

where A is selected from the group consisting of hydrogen atoms, halogen atoms and alkyl radicals, B is selected from the group consisting of hydrogen atoms, halogen atoms, alkyl radicals and hydroxyl radicals, at least one of the substituents A and B being a hydrogen atom, with a mixture containing a 2,6-trans, trans pentaenal having the carbon skeleton and chemical composition of vitamin A aldehyde and thereby forming a crystallizable complex of said phenolic compound and said pentaenal, and separating said complex from said mixture.

13. The method which comprises admixing a phenolic compound of the formula

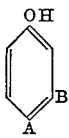

where A is selected from the group consisting of hydrogen atoms, halogen atoms and lower alkyl radicals, B is selected from the group consisting of hydrogen atoms, halogen atoms, lower alkyl radicals and hydroxyl radicals, at least one of the substituents A and B being a hydrogen atom, with a mixture containing a 2,6-trans, trans pentaenal having the carbon skeleton and chemical composition of vitamin A aldehyde and thereby forming a crystallizable complex of said phenolic compound and said pentaenal, and separating said complex from said mixture.

14. The method which comprises admixing a phenolic compound of the formula

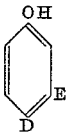

where D is selected from the group consisting of alkyl radicals and halogen atoms, E is an alkyl radical, with a mixture containing a 2,6-trans, trans pentaenal having the carbon skeleton and chemical composition of vitamin A aldehyde and thereby forming a crystallizable complex of said phenolic compound and said pentaenal, and separating said complex from said mixture.

15. The method which comprises admixing a phenolic compound of the formula

where D is selected from the group consisting of lower alkyl radicals and halogen atoms, E is a lower alkyl radical, with a mixture containing a 2,6-trans,trans pentaenal having the carbon skeleton and chemical composition of vitamin A aldehyde and thereby forming a crystallizable complex of said phenolic compound and said pentaenal, and separating said complex from said mixture.

16. The method which comprises admixing alpha-naphthol with a mixture containing a 2,6-trans,trans pentaenal having the carbon skeleton and chemical composition of vitamin A aldehyde and thereby forming a crystallizable complex of said alpha-naphthol and said vitamin A aldehyde, and separating said complex from said mixture.

17. The method which comprises admixing beta-naphthol with a mixture containing a 2,6-trans,trans pentaenal having the carbon skeleton and chemical composition of vitamin A aldehyde and thereby forming a crystallizable complex of said beta-naphthol and said vitamin A aldehyde, and separating said complex from said mixture.

18. The method which comprises admixing phenyl-hydroquinone with a mixture containing a 2,6-trans,trans pentaenal having the carbon skeleton and chemical composition of vitamin A aldehyde and thereby forming a crystallizable complex of said phenyl-hydroquinone and said vitamin A aldehyde, and separating said complex from said mixture.

19. The method which comprises admixing phenol with a mixture containing 2,6-trans,trans vitamin A aldehyde admixed with a cis form of said aldehyde and thereby selectively forming a crystallizable complex of said 2,6-trans,trans vitamin A aldehyde and said phenol, and separating said complex from said mixture.

20. The method which comprises admixing 3,4-dimethyl phenol with a mixture containing 2,6-trans,trans vitamin A aldehyde admixed with a cis form of said aldehyde and thereby selectively forming a crystallizable complex of said 2,6-trans,trans vitamin A aldehyde and said 3,4-dimethyl phenol, and separating said complex from said mixture.

References Cited in the file of this patent
FOREIGN PATENTS

| | | |
|---|---|---|
| 2,683,746 | Benton et al. | July 13, 1954 |
| 2,683,747 | Benton et al. | July 13, 1954 |